United States Patent Office.

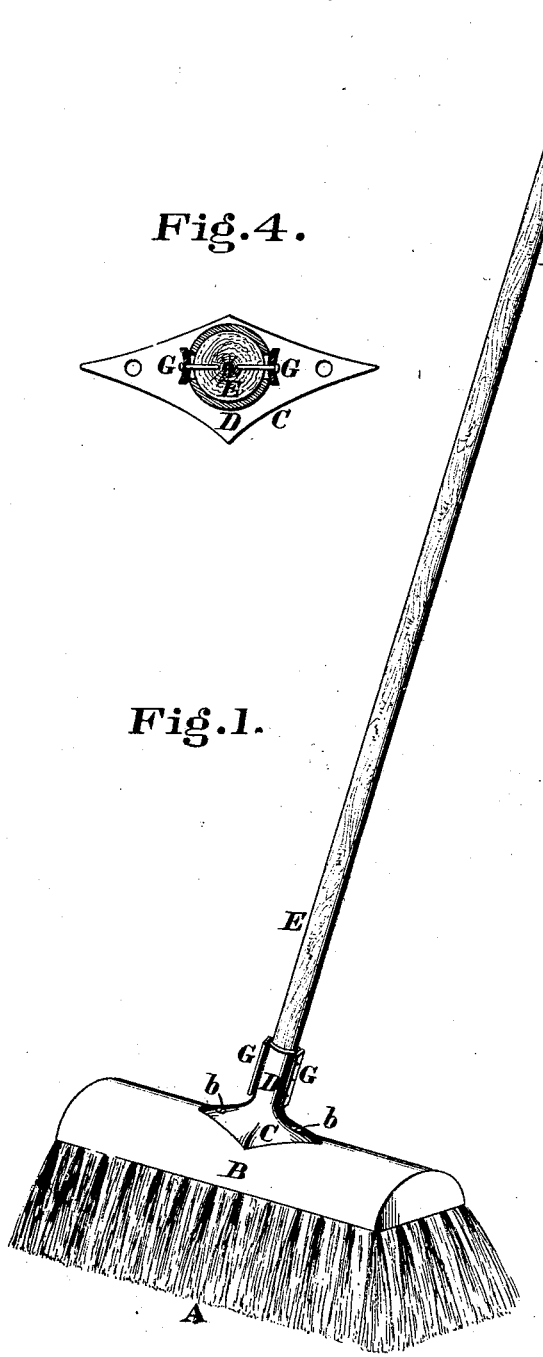

HENRY ACHEW, OF CINCINNATI, OHIO.

Letters Patent No. 110,325, dated December 20, 1870.

IMPROVEMENT IN SOCKETS FOR BROOM-HANDLES.

The Schedule referred to in these Letters Patent and making part of the same.

I, HENRY ACHEW, of Cincinnati, Hamilton county, Ohio, have invented a new and improved Socket and Handle for Brooms, of which the following is a specification.

My invention relates to that class of brooms having wooden heads, and the improvement consists in a metallic socket, which is secured to the said heads at any convenient angle, the handle being inserted and secured to the socket in a manner which will be hereafter fully described.

And further, in providing the lower portion of a broom-handle with one or more pads or cushions of leather, rubber, or other suitable material, for the purpose of preventing injury to furniture by the handle coming in contact with the same in the act of sweeping.

Figure 1 is a perspective view of a broom provided with my improvements.

Figure 2 is a vertical section through the lower portion of the handle.

Figure 3 represents the handle and socket detached from the broom and from each other.

Figure 4 is a transverse section through the socket and handle, the last two views being drawn on an enlarged scale.

A represents a broom having a wooden head, B, to which is attached, by screws $b$, a metallic socket, C, whose tubular stem D is adapted to receive the handle E.

The bore of the stem D is somewhat larger in diameter at its lower than at its upper end, so that, when the handle E is inserted therein, and a wedge, F, driven into the butt end of the handle, the latter is immovably secured in the socket.

Attached to the sides of handle E, either by screws or by tacks $e$, are cushions or pads G, which are composed either of leather, India rubber, or any other suitable soft and yielding material.

When the handle is inserted in the socket the tacks $e$ traverse slots $d$ in the stem D, as clearly shown in fig. 4.

In attaching the socket to the broom-head it is preferred to do it in such a manner as to impart to the handle that inclination which is the most convenient for the operator, and after the broom has been worn down by continual use the socket can be turned around, so as to cause the handle to project from the opposite side of the head, and thus make available the unused side of the broom.

By inserting the handle in the socket and wedging it, and then securing the said socket to the head B, it will be impossible for the handle to be accidentally detached from the broom proper.

The cushions or pads G prevent the metallic portion of the handle injuring the furniture, and are found very serviceable in sweeping around and under bureaus and other large articles of furniture.

If preferred, the wedge F may be omitted and the handle may be secured to the socket by the pins $e$, or a female thread may be formed on the interior of the stem D, and the handle may be screwed therein.

Claim.

I claim as new and of my invention—

The combination, substantially as described, of the reversible socket C D, handle E, and pads G, for the purpose set forth.

In testimony of which invention I hereunto set my hand.

HENRY ACHEW.

Witnesses:
 GEO. H. KNIGHT,
 JAMES H. LAYMAN.